United States Patent
Suleiman et al.

(10) Patent No.: US 9,424,288 B2
(45) Date of Patent: Aug. 23, 2016

(54) ANALYZING DATABASE CLUSTER BEHAVIOR BY TRANSFORMING DISCRETE TIME SERIES MEASUREMENTS

(71) Applicant: Oracle International Corporation, Redwood Shores, CA (US)

(72) Inventors: Yaser I. Suleiman, Santa Clara, CA (US); Michael Zoll, Foster City, CA (US); Angelo Pruscino, Los Altos, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 206 days.

(21) Appl. No.: 13/791,651

(22) Filed: Mar. 8, 2013

(65) Prior Publication Data

US 2014/0258254 A1 Sep. 11, 2014

(51) Int. Cl.
G06F 17/30 (2006.01)

(52) U.S. Cl.
CPC .... G06F 17/30306 (2013.01); G06F 17/30572 (2013.01); G06F 17/30716 (2013.01)

(58) Field of Classification Search
CPC . G06F 11/3409; G06F 17/18; G06F 11/3051; G06F 11/3058; G06F 17/30339; G06F 17/30702; G06F 17/30306
USPC .................................. 707/600–608, 736–757
See application file for complete search history.

(56) References Cited

U.S. PATENT DOCUMENTS

| | | | |
|---|---|---|---|
| 7,509,336 B2 * | 3/2009 | Buckler | |
| 7,542,998 B1 | 6/2009 | Lavie et al. | |
| 8,200,525 B2 | 6/2012 | Kilger et al. | |
| 8,719,190 B2 | 5/2014 | El-Rafei | |
| 2003/0158795 A1* | 8/2003 | Markham | B23Q 35/12 705/28 |
| 2003/0188189 A1 | 10/2003 | Desai et al. | |
| 2004/0024773 A1* | 2/2004 | Stoffel | G06N 5/025 |
| 2006/0004839 A1* | 1/2006 | Nagasawa | G06F 11/1471 |
| 2006/0074970 A1* | 4/2006 | Narayanan et al. | 707/102 |

(Continued)

OTHER PUBLICATIONS

Zhang, Jian; Learning-Aided System Performance Modeling in Support of Self-Optimized Resource Scheduling in Distributed Environments; 2007; University of Florida; http://ufdc.ufl.edu/UFE0021738/00001/pdf (146pages).

(Continued)

*Primary Examiner* — Michelle Owyang
(74) *Attorney, Agent, or Firm* — Vista IP Law Group, LLP; Peter Mei

(57) ABSTRACT

A method, system, and computer program product for analyzing performance of a database cluster. Disclosed are techniques for analyzing performance of components of a database cluster by transforming many discrete event measurements into a time series to identify dominant signals. The method embodiment commences by sampling the database cluster to produce a set of timestamped events, then pre-processing the timestamped events by tagging at least some of the timestamped events with a semantic tag drawn from a semantic dictionary and formatting the set of timestamped events into a time series where a time series entry comprises a time indication and a plurality of values corresponding to signal state values. Further techniques are disclosed for identifying certain signals from the time series to which is applied various statistical measurement criteria in order to isolate a set of candidate signals which are then used to identify indicative causes of database cluster behavior.

20 Claims, 10 Drawing Sheets

(56) References Cited

U.S. PATENT DOCUMENTS

| | | | |
|---|---|---|---|
| 2012/0066204 A1* | 3/2012 | Ball | G06F 17/30592 707/713 |
| 2012/0117009 A1 | 5/2012 | Dutt et al. | |
| 2012/0117226 A1* | 5/2012 | Tanaka et al. | 709/224 |
| 2012/0303619 A1* | 11/2012 | Fisera | G06Q 50/06 707/737 |
| 2012/0317274 A1* | 12/2012 | Richter | G06Q 10/06 709/224 |
| 2014/0201120 A1 | 7/2014 | Lydon | |
| 2014/0258187 A1 | 9/2014 | Suleiman et al. | |

OTHER PUBLICATIONS

Non-Final Office Action dated Jan. 15, 2015 in U.S. Appl. No. 13/791,669, filed: Mar. 8, 2013, inventor: Yaser Ib Suleiman (19pages).

Final Office Action dated Jul. 8, 2015 for U.S. Appl. No. 13/791,669.

Third-Party Submission under 37 CFR 1.290 dated Sep. 19, 2014 for related U.S. Appl. No. 13/791,669.

Non-final Office Action dated Mar. 10, 2016 for related U.S. Appl. No. 13/791,669.

* cited by examiner

```

3177772662,1,166518427,"11-04-2010 14:12:38.450427000", 1278, 5288, 1, 313, "6d2tgzf4pfaq9", 0, 2, 0,
"4kh23cby183rx", 47,342492280,1,105,0, 16809258,"11/04/2010 14:12:37",28326443,2,28326443,1,0,0,0,
2652584166,21027,99,597250,1,15987,0,4294967291,0,1, 28326402, 99, 597250, 0, 3718, 020100019001F17C2,
0,1024,1562528637, "JDBC Thin Client", "csi.instance.transaction.server.TransactionLi:R","15323"

3177772662,1,166518427,"11-04-2010 14:12:38.450427000", 1303, 9387, 1,313, "dr0sk6agq93wp", 0, 47 ,0 ,"" , 0, 0, 0,
0, 0, 16777224, "11/04/2010 14:09:49", 4708718, 12, 0, 0, 0, 0, 512320954, 57132, 2813, 447327, 1, 0, 0,
4294967294, 0, 1, 10281573, 2813, 447327, 0, 3718, 09B30000E0003FDE1, 0, 5120, 2904914147, "rwrun@amts679
(TNS V1-V3)", "PAXTRTRX", "Concurrent Request"

```

| TIME,e0,e1,e2,e3,e4,e5,e6,e7,e8,e9,e10,e11 | ,e12,e13,e14,e15,e16,e17,e18,e19 |
|---|---|
| 40477.4043503,33586,0,28147,119765,0,0,0,0,0,915501,0,0,0,0,0,0,0,0,1427,0 | |
| 40477.4043621,11956,1010,2144,4907,10728,0,0,0,14974,343514,0,0,0,0,0,582,722776,0,1020,6903 | |
| 40477.4043741,10514,2056319,29040,10265,0,0,0,0,0,0,0,0,0,829,0,0,0,0 | |
| 40477.4043860,7265,3084479,26576,25774,490294,0,0,0,280407,0,0,0,0,0,0,458,0,0,0,0 | |
| 40477.4044010,18979,4380478,87361,1637,299195,0,0,0,1812296,0,0,0,0,0,0,0,0,1953179,0,0 | |
| 40477.4044128,14027,5399998,24644,8155,24750,0,0,0,2061,0,0,7945,3379,0,0,11412,984,0,0,0,0 | |
| 40477.4044248,10773,6436797,31644,0,64070,0,0,0,8096,0,0,0,0,0,0,0,0,0,0 | |
| 40477.4044367,9172,7464957,21992,5414,14153,0,0,0,1061625,608362,0,0,0,0,0,0,0,0,0 | |
| 40477.4044501,10482,8622717,49405,6248,28135,0,0,0,976942,0,0,3621,0,0,0,504700,681501,0,0 | |

FIG. 4B

ANALYZING DATABASE CLUSTER BEHAVIOR BY TRANSFORMING DISCRETE TIME SERIES MEASUREMENTS

RELATED APPLICATIONS

The present application is related to co-pending U.S. patent application Ser. No. 13,791,669, entitled "GENERATING DATABASE CLUSTER HEALTH ALERTS USING MACHINE LEARNING", filed on even date herewith, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of database cluster environments and more particularly to techniques for analyzing database cluster behavior.

BACKGROUND

Some embodiments of the present disclosure are directed to an improved approach for implementing analyzing database cluster state and behavior by transforming large volumes of unrefined raw sensory data and big collections of diverse overall-system snapshots data into a few, but critically indicative, time series signals and model.

The disclosure relates generally to techniques applicable in the database cluster environments and more particularly to techniques for refining and processing large and diverse volumes of raw overall-system samples and sensory data. Legacy approaches fail to process the massive amounts of time-base measurements into a manageable set of state-insinuating signals.

Modern database clusters are massively configured, having hundreds or thousands of processors and even more shared resources. They are extremely complex, and capable of executing trillions of instructions per second. Any one or more processors may need access to a shared resource (e.g., a device, a semaphore, a communication bus, etc.), and the processor (hardware paradigm) or processes (software paradigm) may need to enter a wait state before gaining access to the shared resource. Researchers have attempted to observe the behavior of processes within these complex systems by taking a series of time-sampled measurements at multiple test points (e.g., service measurements) in the cluster. Such service measurements frequently include sampling of running processes so as to collect and timestamp events (e.g., events and wait state data) for every active session or process in the cluster. This results in the accumulation of large and diverse volumes of data with important implications for system health state, which range from expanded performance metrics to internal and external resource utilization to workload statistics and to detailed processes logs.

While legacy solutions can perform rudimentary filtering and display of a series of time-stamped event data, these legacy solutions are unable to match the amplified levels of sensory data generated in large database clusters. Legacy solutions fail in many regards, and their main shortcomings can be attributed to their inadequacies to discern meaningful information buried inside immense and diverse raw data; insight and knowledge are obfuscated. Researchers need to see or infer information from the data. Legacy solutions suffer myriad dramatic shortcomings in their ability to process the data to foster development of human understanding and inference. For example, legacy solutions suffer many shortcomings due to their reliance on naïve algorithms (e.g., simple threshold techniques, which could suffer from high false alarm rates and/or high occurrences of alarms that are missed) and/or failure to recognize and respond to the dynamic changes in the target system behavior buried inside the raw sensory data. This could result in various misleading or obfuscating events ranging from presentation of wrong or misleading data, to the generation of inaccurate results, to failure to present of critical information antecedent to insight.

Such shortcomings of legacy techniques are further exacerbated in the context of modern database clusters which are extremely complex and can span large cluster systems capable of producing billions of raw measurements per second. This has become too cumbersome to be processed by human labor.

Thus legacy techniques fail to provide anything more than an impenetrable mountain of raw data, leaving researchers unable to perceive and discern the changing states, performance bottlenecks, and nature of service availability of the entire cluster system. What's needed are techniques to transform raw measurements into various forms of time series that are conducive to applying a robust learning model for the corresponding target system. The needed time series format and model are to be used to predict a system's availability and health state.

Moreover, the aforementioned technologies often fail to identify critical information. Worse, legacy techniques produce inaccurate information, and/or wrong information in their conclusions regarding the observed cluster system states. Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for analyzing database cluster behavior by the automatic processing and transformation of large and extensive volumes of raw sensory and other diverse measurement data into a few but significant system's state-insinuating compositions, in the form of time series and a learning model that serve as the primary predictors and indicators of many of the database cluster aspects (e.g., current and predicted health state, and system availability).

Disclosed herein are techniques for analyzing performance of components of a database cluster by transforming many discrete event measurements into a time series to identify dominant signals. One embodiment commences by sampling the database cluster to produce a set of timestamped events, then pre-processing the timestamped events by tagging at least some of the timestamped events with a semantic tag drawn from a semantic dictionary and formatting the set of timestamped events into a time series where a time series entry comprises a time indication and a plurality of signal state values that occur at the time of the time indication. Further techniques are disclosed for identifying certain signals from the time series to which is applied various statistical measurement criteria in order to isolate a set of candidate signals (e.g., dominant signals) which are then used to identify indicative causes of database cluster behavior.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 4B is a schematic depiction of a discrete event to time series signal transformation, according to some embodiments.

DETAILED DESCRIPTION

Figure 1:
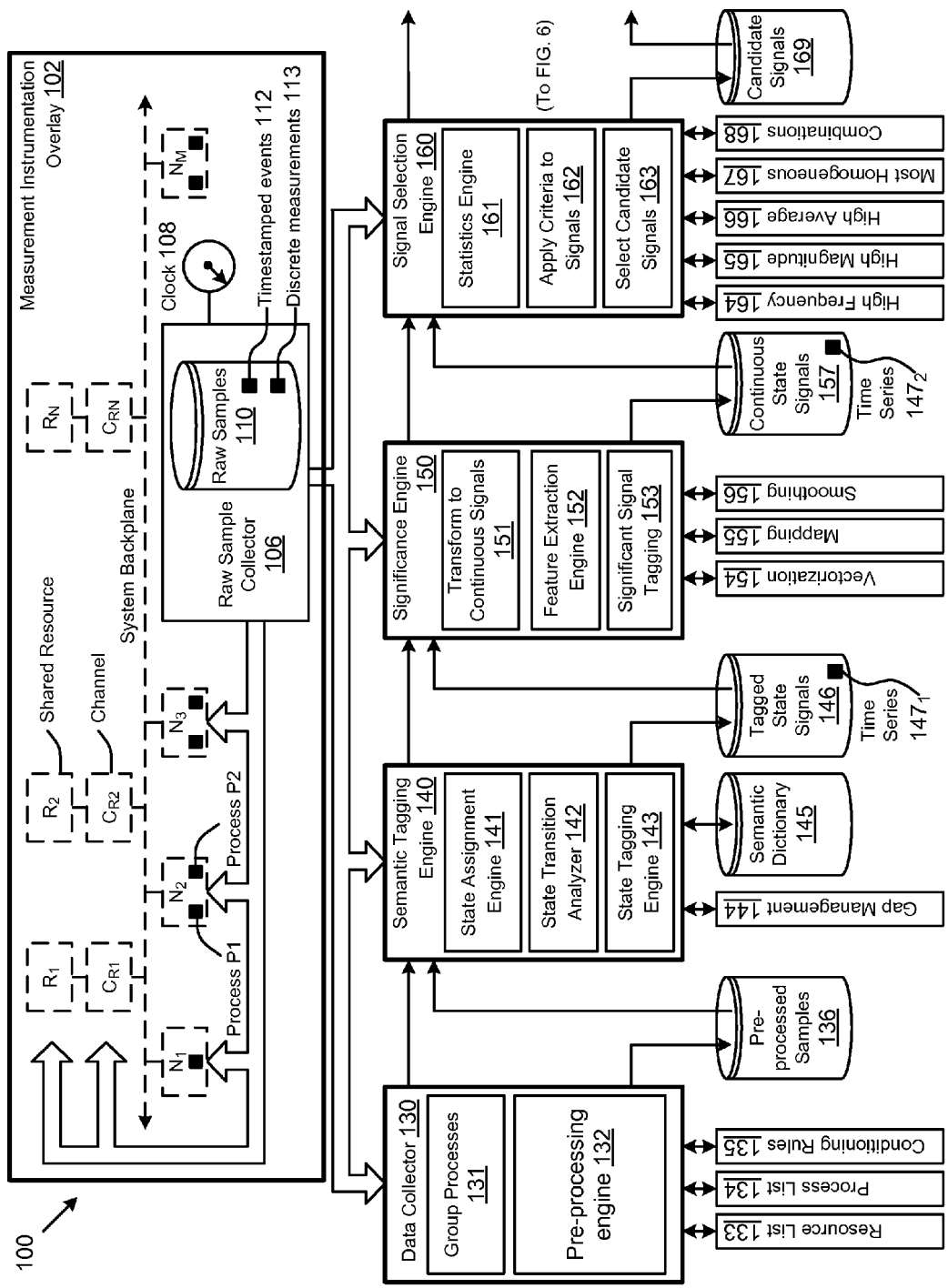
FIG. 1 is a block diagram of an instrumented database cluster configured for analyzing database cluster behavior, according to some embodiments.

Some embodiments of the present disclosure are directed to an improved approach for implementing analyzing database cluster behavior by transforming many discrete time series measurements into a few meaningful signals. More particularly, disclosed herein are exemplary environments, methods, and systems.

Overview

Described herein-below and in the accompanying figures are scalable methods and apparatus for implementing analyzing database cluster behavior by transforming many discrete time series measurements into a few meaningful signals.

The figures and discussion herein collects and transforms raw measurements (e.g., captured data obtained from shared distributed clusters) into specially formatted time series formats. Techniques applicable to formatting massive amounts of data, and for performing signal processing on massive amounts of data are herein disclosed. Specific implementations of such techniques are chained together in order to achieve transformations from raw data into human insight.

The aforementioned formatting of time series signals facilitates downstream processing in order to distill a massive amount of data into an insightful presentation of signals. Those skilled in the art will recognize that raw data collected from a cluster computing system is captured initially as a collection of system snapshots, time-based samples, and various other sensory data. Such raw data as initially captured is typically a massive extent of noisy and incomplete data. Raw captures often are incomplete in that they are missing some data points and/or have other gaps present in the initial capture. Moreover, the initial capture may have redundancies in that the same data is captured at different sources in the system. The raw capture data is immensely huge, and is not initially organized into a time series or any other format that facilitates analysis and presentation so as to precipitate actionable intelligence.

The herein-disclosed transformation and formatting of time series signals enables advanced techniques from statistical learning theory and pattern recognition to be applied (e.g., on the formatted data) in order to extract revealing information about the system state and its availability. As will become apparent to those skilled in the art, both the output format, as well as the techniques involved in the transformation, serve to overcome the limitations that plague legacy attempts.

In some cases the herein-disclosed techniques introduce the capability to present discrete events (e.g., a wait event) as a continuous time series signal. Since there can be a large number of discrete events, herein-disclosed techniques are introduced so as to identify, prioritize and select just a few signals (out of many) that most likely convey the state of the system.

Definitions

Some of the terms used in this description are defined below for easy reference. The presented terms and their respective definitions are not rigidly restricted to these definitions—a term may be further defined by the term's use in within this disclosure.

- The term "cluster" means any combination of hardware and software components that operate cooperatively to implement a database system.
- The term "shared resource" means any hardware or software component that can be accessed in a serially-reusable manner or in a managed concurrent manner.
- The term "process" refers to a software component running within a cluster.
- The term "channel" means any hardware or software component that processes requests or messages between a process and a shared resource.
- The term "sensor data" means any timestamp or value or state of any constituent components of a cluster.
- The term "system snapshot" means any combination of sensor data as taken at a particular time.
- The term "epoch" means a period of time during which measurements are intended to be taken.
- The term "logic" means any combination of software or hardware that is used to implement all or part of the embodiments of the present disclosure.
- A "module" includes any mix of any portions of computer memory and any extent of circuitry including hardwired logic or circuitry embodied as a processor.

Reference is now made in detail to certain embodiments. The disclosed embodiments are not intended to be limiting of the claims.

DESCRIPTIONS OF EXEMPLARY EMBODIMENTS

FIG. 1 is a block diagram of an instrumented database cluster 100 configured for analyzing database cluster behavior by transforming many discrete event measurements into a time series to isolate dominant signals. As an option, the present instrumented database cluster 100 may be implemented in the context of the architecture and functionality of the embodiments described herein. Also, the instrumented database cluster 100 or any aspect therein may be implemented in any desired environment.

The constituent components as shown in the block diagram serve for analyzing database cluster behavior (e.g., longest wait state behavior, shortest wait-state behavior, process-to-process contention, etc.) by the transformation of large and extensive volumes of raw sensory data and other diverse measurement data into a few but sufficient system's state-insinuating compositions. In an exemplary embodiment, processing includes steps that transform large and extensive volumes of raw data into a formatted time series. The time series is so sufficiently formatted (e.g., including metadata) that learning models can be applied to the time series in order to distill into database cluster features (e.g., predicting cluster services availability, detecting drifts into anomalous states, determining current state, predicting an overall health state, etc.).

In the embodiment shown, a measurement instrumentation overlay 102 comprising one or more measurement instruments is configured to take measurements of a "device under test" (e.g., a database cluster system) using a measurement instrument (e.g., an operating system monitor, an interrupt routine, etc.). The device under test can be a large and complex system, and as shown, the device under test comprises a number of nodes (e.g., $N_1$, $N_2$, $N_3$, $N_M$), that communicate with a number of resources (e.g., shared resource $R_1$, shared resource $R_2$, shared resource $R_N$), through channels (e.g., channel $C_{R1}$, channel $C_{R2}$, channel $C_{RN}$, etc.), over a communication network (e.g., system backplane). Alternatively, the device under test can comprises a single node (e.g., just $N_1$), that communicates with a number of resources (e.g., shared resource $R_1$), through a channel (e.g., channel $C_{R1}$).

During operation of the device under test (e.g., a database cluster system), a raw sample collector 106 receives large volumes of unrefined, raw sensory data and extensive collections of system snapshot data. The raw sample collector 106 can receive such data at high rates and in high volumes using known-in-the-art techniques, and raw sample collector 106 can store raw data into a database of raw samples 110 comprising any number of timestamped events 112 and/or discrete measurements 113. Any raw samples of whatever form can be time stamped with a clock time using a real-time clock 108 to produce timestamped samples (e.g., that capture a snapshot of the hardware device or software condition being samples) or timestamped events (e.g., which timestamped events may have been sampled in response to the occurrence of an interrupt or other raising of an event). Timestamped events 112 can be abstracted. For example, a large collection of data in the form of a system snapshot might be in fact collected over a lengthy time period, yet, the raw sample collector 106 might timestamp the system snapshot with only two timestamped events 112, namely a timestamp corresponding to a start event (e.g., the clock time of the first collected raw sample of the system snapshot), and an ending event (e.g., the clock time of the last collected raw sample of the system snapshot).

As an overview, after the raw data is collected (see data collector 130), the raw samples 110 are processed so as to support downstream processing. Many techniques for downstream processing are disclosed herein, and many of those techniques can be chained together to achieve some particular state of analysis and/or configuration. The description given here in this discussion of FIG. 1 is purely illustrative and other selections of techniques and/or order of application of the techniques is possible and envisioned.

A data collector 130 performs operations to group processes 131 and perform operations for data cleaning, merging, and reduction. In this stage, noise and redundancies in raw data will be filtered out, and the data relevant to a set of identified processes (e.g., sessions) and a set of identified resources will be gathered (e.g., see pre-processing engine 132) and stored into a database of pre-processed samples 136. Downstream processing includes semantic tagging (see semantic tagging engine 140). The tagged state signals 146 are received as inputs by a series of modules configured to transform the discrete signals into continuous state signals (see significance engine 150). Even given the amplified signals as a result of the processing in the significance engine, a further downstream module (see signal selection engine 160) operates on a hypothesis (e.g., forms hypothesis, tests hypothesis, and selects candidate signals based on the results of the hypothesis testing). The fewer number of representative signals that most likely confer the state of the system can now be processed by an agent using one or more signal processors (e.g., signal processors 620).

Again referring to the data collector 130, this engine serves to identify the groups of process that are accessing particular resources (e.g., shared resource $R_1$, shared resource $R_2$, shared resource $R_N$). The data collector 130 also serves for distilling, cleaning and the validating of raw input data, possibly using the shown pre-processing engine 132. The pre-processing engine 132 and operations therein serves many pre-processing steps including reducing the amount of stochastic noise that is often present in the raw samples (e.g., as a by-product of the discrete nature of measuring in discrete time samples). Strictly as an example, a pre-processing engine 132 can filter out noise and redundant data, and can check for outliers (e.g., measurements, samples or readings that are deemed to be corrupt or deemed to be unrealistically excessive). In some cases a pre-processing engine 132 can replace outliers by estimated or clamped or interpolated values. In other cases outliers can be eliminated from further analysis. In some situations the raw data is projected in terms of multiple dimensions. For example, processes within pre-processing engine 132 can define a fixate point (e.g., anchor) pertaining to a particular resource or event (or other measurement or aspect of a measurement) and then examine the data relative to the fixate point in order to determine relative aspects such as corresponding processes and their time spent in various states relative to the fixation point.

The foregoing are merely illustrative examples of pre-processing and storing into a database of pre-processed samples 136. Further operations and data structures facilitate flexibly chaining techniques from one to another. The data collector is implemented with several plug-ins for data storage and algorithms. As shown, the data collector 130 uses plug-ins for a resource list 133, a process list 134, and a plug-in for data conditioning rules 135.

Continuing with the discussion of FIG. 1, a series of semantic tagging processes are performed by a semantic tagging engine 140. Of course raw data, even if pre-processed as described in the foregoing paragraph, is just raw data. What is often desired is to map meaning (e.g., semantics) onto the pre-processed data. In general terms, a semantic tagging engine serves to assign states (e.g., using a state assignment engine 141) and make determinations as to the state and state transitions of a given process with respect to a particular shared resource. For example, it might be determined (e.g., from the pre-processed signals) that a process P1 had been in a wait state, waiting on a shared resource R1 for a period during which another process P2 had gained repeated access to shared resource R1. This scenario illustrates that there is (or can be) meaning to a sequence of measurements. Further, the extraction of the pre-processed data into some meaning can be performed by an automatic process such as a state assignment engine 141, a state transition analyzer 142, and a state tagging engine 143.

In exemplary embodiments, there are many semantics that can be lifted or extracted from the pre-processed data. Accordingly, the semantic tagging engine 140 combines the services of a semantic dictionary 145 and a state tagging engine 143. Using the semantic dictionary and a state tagging engine, the semantic tagging engine 140 can assign a discrete semantic state to processes, and changes over time of the discrete semantic state can be analyzed to identify state changes of interest, and further processing can perceive the meaning (e.g., semantics) of the state changes. Using the semantic dictionary, the semantics can be tagged onto the state signals and stored in a persistent (or non-persistent) storage location (e.g., see database of tagged state signals 146). In one aspect of the time series and model, the occurrence of semantics (words, names) for observable occurrences of signals and signal transitions presents a model for human understanding.

In some situations, state transitions, and hence the semantics derived from state transitions, are temporally dispersed. For example, a process might sleep for a long time in one state, and then come out of that state when moving to another state. Accordingly, some implementations employ one or more techniques for gap management (e.g., note gap management plug-in 144). A gap can take on many forms; for example, a gap can refer to the periods where a particular shared resource process is absent from the raw data. In some cases a gap may be artificially filled via an assumed value (e.g., '0') or it can be filled in via an interpolation technique. In exemplary flows, techniques are now applied to identify significance in the tagged state signals. The significance engine and its constituents are now briefly discussed.

The significance engine 150 and its constituents produce vectorized values that are continuous over time or an epoch of time (see vectorization plug-in 154). Each value in a vector represents the magnitude or state of a particular feature or metric (e.g., the state of a tracked resource at a particular point in time). The production of such values typically involves the transformation or mapping of multi-dimensional data (e.g., data tagged with different semantics from the previous processes) into a compound magnitude/value that reasonably conveys a statistical significance of the resource. A compound magnitude/value can comprise a single value that is derived from several values possibly with different semantics. For example, a single value can be derived from several values using an algorithm or other technique for interpretation. Strictly as an illustration, consider a situation covering three semantics:

- imagine that at time point $t_n$ a shared resource $R_M$ has an x-group of sessions open, with each session reporting its wait time taken to access the resource $R_M$;
- further, y-group of sessions that happened to continue to wait for the resource (e.g., each session may have started at different time in the past), and further;
- z-group of sessions that have just started to wait for the shared resource.

Now, for the processes in semantics groups y and z, it is not effective to simply take their numbers and average the total since it not necessarily known for how much longer these sessions will wait before accessing the resource or terminate. Instead one technique employs an adaptive interpretation/algorithm to estimate a "single" compound value where each of the several reported original values will be considered in the calculations. In some cases a "single" compound value is calculated from the several reported original values with an appropriate weighting factor applied to the original values. Such a mapping can be performed by a mapping plug-in 155.

The smoothing plug-in 156 serves to filter out large changes in signals. It is often an undesirable circumstance when a signal fluctuates excessively. High fluctuations (e.g., possibly due to sampling rates) can sometimes unfairly skew statistical analysis and such skew risks compromising the usefulness of the signal. For example, it is possible to postpone the participation of "just"-started-to-wait processes in the waiting-time calculation formula (for a shared resource) if there exist some other processes that do report real positive non-zero waiting values (i.e., just finished waiting semantic) To illustrate this point, consider that at a particular point in time there are two semantic sets of signals, say x=3 sessions that report time-waited values (e.g., 2 milliseconds, 4 milliseconds, 3 milliseconds, respectively), and in the case of observing y=25 sessions having "just-started" (with zero time-waited) to wait on the shared resource $R_M$. Merely calculating the average without considering the state semantics among the sessions end up with this calculation: $(2+4+3)/(3+25)=0.3$. This value is much less than any of the observed 2, 4, or 3 millisecond wait times as were actually measured. Therefore, a naïve averaging algorithm will cause the estimated result to be skewed. As an improvement, an advanced adaptive algorithm (e.g., a smoothing algorithm) can apply certain weights based on semantics in order to facilitate the generation of a smooth and semantically consistent estimate. The smoothing process helps produce more robust and steady values that are conducive to sequential and other statistical analysis used in deriving insights. Following the foregoing, it is quite possible that the data transformations include multi-dimensional data describing a same shared resource. For example, each feature or aspect discovered pertaining to a shared resource might be plotted over time, and any given feature might change with respect to a second given feature. In some cases, multi-dimensional data can be rolled-up or smoothed (see significance engine 150). As shown, the significance engine 150 comprises a smoothing plug-in 156.

After the significance engine performs vectorization (e.g., see vectorization plug-in 154), mapping (e.g., see mapping plug-in 155) and smoothing (e.g., see smoothing plug-in 156), the significance engine employs a transform to continuous signals 151, which transforms the tagged state signals 146 into continuous signals suited for input into a feature extraction engine 152. The continuous signals now being in a vector form that includes vectors of feature are suited for significant signal tagging 153. The signals as processed by the significance engine can be stored in a database of continuous state signals 157. The mere occurrence of a particular signal in the database of continuous state signals 157 as output by the significance engine does necessarily mean that that particular signal is useful in developing insight. On the contrary, the occurrence of a signal in the database of continuous state signals 157 as output by the significance engine only means that the signal was not deemed to be insignificant and/or was not deemed to be in error to the extent that it was eliminated, and in exemplary cases, a database of continuous state signals 157 would also comprise tagged or untagged portions of a time series $147_2$. The determination as to whether or not a signal is deemed to be a good candidate for human or agent analysis is an operation of the signal selection engine 160, which is now briefly discussed.

Given the database of continuous state signals 157, a signal selection engine 160 employs a statistics engine 161, then applies statistical or other quantitative criteria to signals 162 and, based on the result of the foregoing, performs an operation to select candidate signals 163. Candidate signals are stored in a database of candidate signals 169, which candidate signals in turn become the subject of one or more signal processors 620 (see FIG. 6). Examples of signal processors include: a display engine 604 (e.g., for displaying a candidate signal on a display screen), a classification engine 606, a clustering engine 608, a data mining engine 610, and/or other signal processing engines, and/or combined chains of signal processors.

Use of such signal processors 620 by a human or agent can reveal actionable insights from the data.

Now, again referring to the signal selection engine 160, and more particularly to the operation to select candidate signals 163, the selection criteria can be driven, at least in part, on statistical measures. For example, a signal might be selected because it has a statistical high average value with respect to other signals in a statistical population. Of course, high average is only one possibility. Other quantitative criteria can be defined, and a plug-in generated so as to facilitate this architecture. Commonly used quantitative criteria include: high frequency, high magnitude, most homogeneous, and others, and combinations. As shown, the high frequency criteria, high magnitude criteria, high average criteria, and most homogeneous criteria are implemented in plug-ins, namely: the high frequency plug-in 164, high magnitude plug-in 165, high average plug-in 166, most homogeneous plug-in 167, and a combination plug-in 168.

Figure 2:
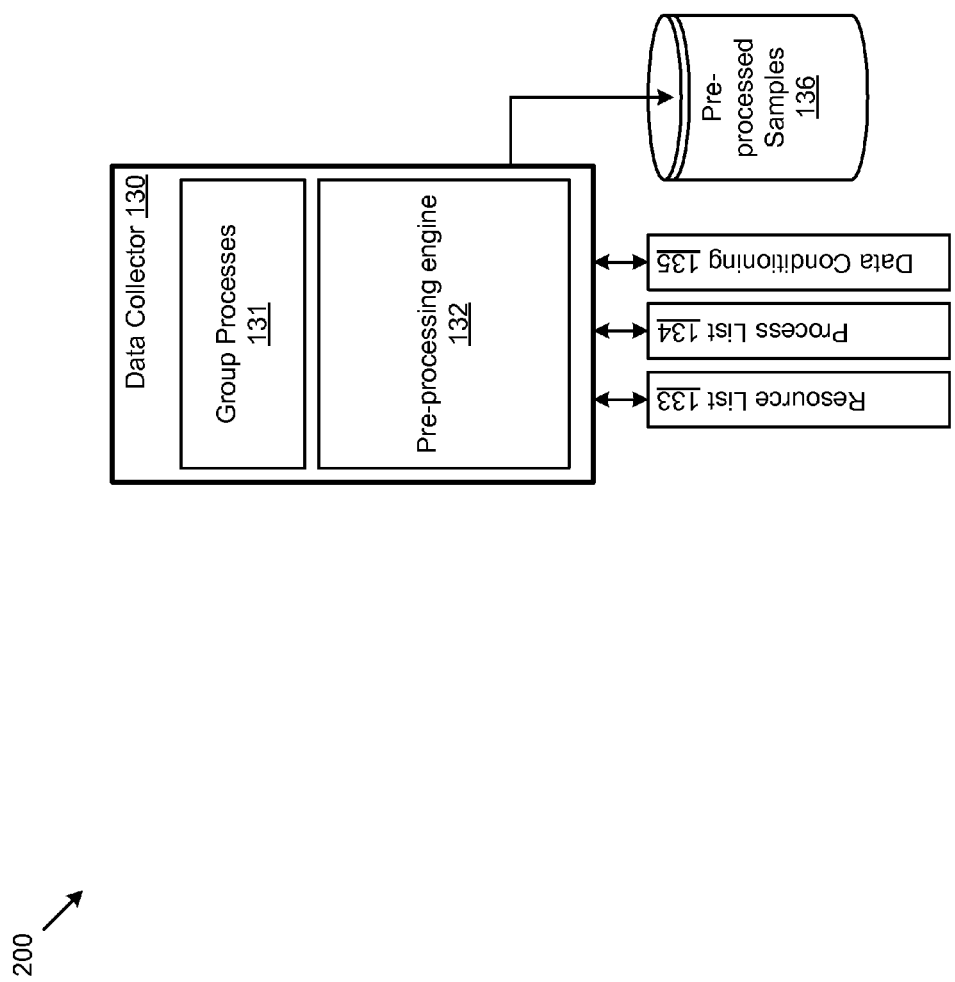
FIG. 2 is a block diagram of data cleansing and reduction engine, in accordance with some embodiments.

FIG. 2 is a block diagram of data cleansing and reduction engine, in accordance with some embodiments. As an option, the present data cleansing and reduction engine 200 may be implemented in the context of the architecture and functionality of the embodiments described herein. Also, the data cleansing and reduction engine 200 or any aspect therein may be implemented in any desired environment.

As shown, the block diagram comprises interconnected components of a data cleansing and reduction engine that serves for data cleaning, merging, and reduction. In this stage, noise and redundancies in raw data will be filtered out, and the data relevant to a set of identified processes (e.g., sessions) and a set of identified resources will be gathered. This system/engine also carries some other important merging functionality. That is, since raw data originates from various sources (e.g., different instances within a node, and/or from different nodes in the cluster), the task of properly merging relevant data and binding them together into unified streams can be performed as a function of the data cleansing and reduction engine 200.

Figure 3:
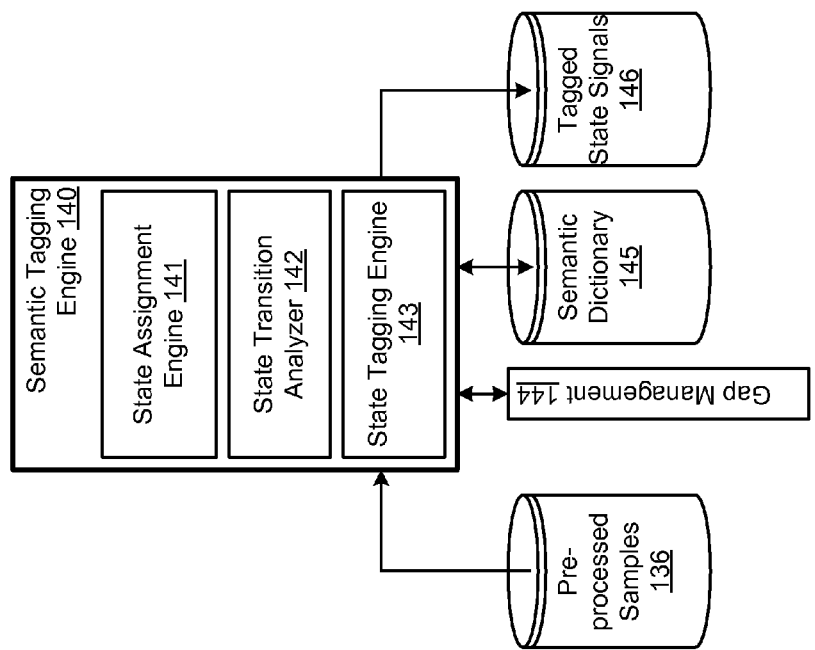
FIG. 3 is a block diagram of a semantic preprocessing system, according to some embodiments.

FIG. 3 is a block diagram of a semantic preprocessing system 300 configured for analyzing database cluster behavior by transforming many discrete event measurements into a time series to isolate dominant signals. As an option, the present semantic preprocessing system 300 may be implemented in the context of the architecture and functionality of the embodiments described herein. Also, the semantic preprocessing system 300 or any aspect therein may be implemented in any desired environment.

The shown semantic tagging engine 140 serves to analyze its input data in terms of the different states a process or session could have with respect to a relationship to a certain shared resource or list of resources. Each identifiable state (of every session in the session list) encompasses a discrete contextual semantic meaning (e.g., as drawn from a set of possible temporal sequence of states/semantics) that highlights the session/resource relationship at any particular observation. For example, a session could have just arrived to wait for a resource, or it could have been found to be waiting in the past and still is waiting, or it could have just finished its wait, or it may never be seen to come out of its wait during an epoch.

Determination of different states can be performed from the perspective of a resource's point of view. Some embodiments determine transitions through different states from the point of view of a process. Accordingly, the semantics change depending on the point of view. The herein-disclosed implementations codify states transitions and corresponding semantics in the form of sequences. For example:

what different types of resources a session has acquired or has attempted to acquire;

in what mode(s) (e.g., in exclusive mode, or in a shared mode, etc.) were they acquired (or pending to be acquired); and how long was the wait.

As aforementioned, the present semantic preprocessing system 300 also detects and handles gaps in input data, and determines what to do when expected data pertaining to certain resources or sessions is not available. Additionally, the semantic preprocessing system links data observations with certain relationships (e.g., temporal, or contextual hierarchal dependencies). Such linking can be used to facilitate the detection of state transitions of processes and resources.

Figure 4A:
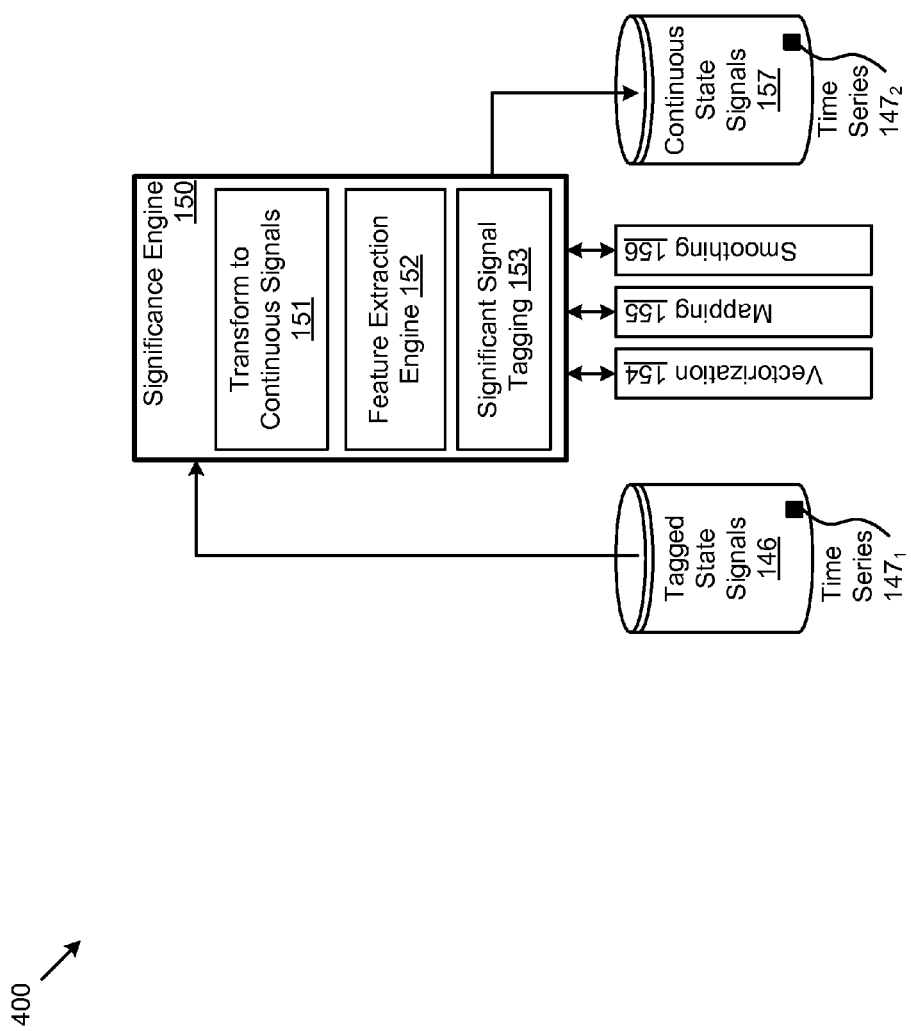
FIG. 4A is a block a block diagram of a system for discrete event to time series signal transformation, according to some embodiments.

FIG. 4A is a block diagram of a system for discrete event to time series signal transformation 400 configured for analyzing database cluster behavior by transforming many discrete event measurements into a time series to isolate dominant signals. As an option, the present system for discrete event to time series signal transformation may be implemented in the context of the architecture and functionality of the embodiments described herein. Also, the system for discrete event to time series signal transformation 400 or any aspect therein may be implemented in any desired environment.

As shown, the block diagram includes a significance engine 150, which engine serves for producing a continuous time series. One exemplary function performed by the significance engine 150 is to produce, at each time-stamped observation, a vector of values where each value indicates the level of contention the target instance incurred to acquire certain shared resources (e.g., incurred by coordinating access, or incurred by letting some process to acquire a shared resource, etc.). In effect, one may consider each computed value as a measure of "drag" (e.g., drag exhibited as sluggishness or unresponsiveness in the system) that the corresponding resource causes. Possible causes are scarcity of resources or a need for serialization, etc. The vector is further comprised of values corresponding to resources in the resource list 133. Of course it is possible that a resource in the resource list 133 will later be determined to have an insignificant impact or effect on how to determine, or predict, target system behavior.

It is appropriate to return to the discussion of vectorization processing (e.g., see vectorization plug-in 154 of the significance engine 150). It often occurs that raw data typically comprises a set of multiple readings that were tagged with potentially different semantics. In such cases (and other cases) the tagging and vectorization can be considered to be "multidimensional". The significance engine 150 can includes algorithms to transform or map the multidimensional semantic to a single compound value for each resource at every time-stamped observation. The algorithms may select and associate a certain significance level for each type of semantic, and then employ arbitrating and smoothing algorithms to transform a "set" of multiple readings into a new single value for each resource.

FIG. 4B is a schematic depiction of a discrete event to time series signal transformation 450. As an option, the present discrete event to time series signal transformation 450 may be implemented in the context of the architecture and functionality of the embodiments described herein. Also, the discrete event to time series signal transformation 450 or any aspect therein may be implemented in any desired environment.

The raw samples 110 as shown, are data samples taken by a measurement instrumentation overlay 102 during operation of a database cluster. Such sampling may produce data samples having potentially hundreds of various wait events as observed during the monitoring period. Some of these wait events may be suggestive of critical state indicators, however others could be less important. As earlier indicated, the raw format of the raw samples 110 can be refined or subjected to certain pre-processing (see FIG. 3). As earlier indicated, such pre-processing can include subjecting the raw samples to conditioning (e.g., see data conditioning rules 135) and tagging (e.g., see semantic tagging engine 140) in order to perform identification and subsequent data transformation of the raw samples. Any given sample may possess many attributes. Still, since the attribute space in exemplary situations is dominated by attributes pertaining to detected wait events, such events are pre-processed more heavily. For example, raw samples 110 can be pre-processed into a tagged state signals 146, possibly including one or more formats of a time series $147_1$ of event values. As shown, the tagged state signals 146 comprise a time series $147_1$ which time series is presented in a comma separated value format having a header row 402 that provides tags (e.g., human-readable names) for entries (e.g., "TIME", "e1", "e2", etc.) that apply to the comma separated values in successive rows. In the embodiment of FIG. 4B, the header column name "TIME" refers to the time indication 448 (e.g., a timestamp) given in the following rows, where each row begins with a time series entry 403. The column names "e0", "e1", "e2", etc. refer to state values 449 (e.g., state value $449_1$, state value $449_{10}$, state value $449_{11}$, etc.) that were sampled at or which persist through the given time of the time indication in the same time series entry. The foregoing are merely examples, and other syntactical formats are possible and envisioned, including tagging using XML or another markup language.

Further describing this particular embodiment, and returning to the embodiment of raw samples 110, the raw samples shown are merely one depiction of how raw samples might be captured by raw sample collector 106. FIG. 4B shows data for just two processes, however in exemplary embodiments, there may be thousands processes and/or other test points from which the raw sample collector 106 can generate raw samples in the thousands or millions of raw samples 110. An exemplary raw sample comprises an event and a timestamp.

The specific transformation "T" applied to the shown raw samples $110_1$ results in the shown time series $147_1$, as given in the nine lines of the "transformed" time series for the shown raw samples 110. Each comma-separated value in nine lines is a timestamp corresponding to a particular event.

Of course, not every event occurs or changes at any particular time. And, in some cases an event may appear to occur spuriously or fluctuate as a consequence of discrete time sampling by the raw sample collector 106. High fluctuations (e.g., possibly due to sampling rates) can sometimes unfairly skew statistical analysis and such skew risks compromising the usefulness of the signal, so smoothing can be advantageously applied. More particularly, and as aforementioned, the smoothing plug-in 156 serves to filter out large or spurious changes in signals so as to mitigate the situation when a signal fluctuates excessively.

In some embodiments, events are selected according to predetermined and/or dynamically-determined criteria. Significant events are discerned, then mapped into wait event samples, and then stored into a sequential time series. A dedicated time series is formulated for each significant wait event. In this manner raw event samples are transformed into streams, each stream comprising sequences of value points, one stream of sequences for each tracked wait event. The values are constructed at successive times and can be spaced at uniform time intervals (or at dynamically-determined time intervals). Each sequence can be regarded as a random variable, and the set of all streams can be considered as a set of random variables that construe the health of the cluster and its performance state.

One possible event selection approach uses the following measurement features:
  measure event states using the feature of observation count, and
  measure wait states by the feature of length of time the system waited on one or more events.

Such measurement features could be captured or and/or stored, and/or retrieved in various forms, such as:
  in an integral form (i.e., values are integrated/summed over a given period), or
  in a frequency distribution form (i.e., values are considered with respect to their rate of change/deltas).

For example, using the integral form, wait events detected during a test period could be sorted based on their respective observation count (e.g., having the most observed events listed on top of the list). A subset of events can then be selected as one input to predict cluster health and performance state. When sampling a system with distributed service times, the samples obtained tend to be biased towards occurrences with larger service times (e.g., since events with larger service times will be statistically more likely to get sampled). In one interpretation, since a database cluster is deemed to perform better when there are few wait states, it follows that events sampled with largest wait states are strongly indicative of cluster health. For example, events that have been sampled as showing large/long wait states can be interpreted as a bottleneck.

Now, returning to the discussion of the time series $147_1$ of FIG. 4B, since raw samples are merely instantaneous snapshots of the system processes at a particular point in time, multiple time wait values could accrue to a single event. Yet, in many cases of downstream analysis, there is a need to resolve to a single state value for each event. This task can involve extensive retrieval and computation since each value in the vector may assume one of several semantic states (see semantic preprocessing system 300, and the discussion of FIG. 3). A semantic state can be codified as a number or as a string or as a function name or a Boolean value or as an XML entity or as an XML attribute, or as an XML attribute value, etc. With respect to the range of possible semantic states, strictly as a examples, semantic states can include:
  A state to begin upon the occurrence when a process just started its wait on an event (and did not finish its wait);
  A state to begin upon the occurrence when a process still continues its wait on the same event (e.g., which wait state had been started at some earlier point in time), and third;

A state to begin upon the occurrence when a process just finished its wait on an event and a wait-time value was reported;

Any other state or state transitions that take into account any or all of the states of each individual wait value in the vector. That is, the aforementioned significance engine 150 and its constituents produce vectorized values, and a value in a vector (e.g., a vector component, a vector dimension) can represent the magnitude or state of a particular feature or metric.

A naive averaging often yields wrong or misleading averages. As an improvement, herein are disclosed the application of algorithms that employ a moving averaging window. In some cases, the moving averaging window takes into account the state of each individual wait value in the vector.

Figure 4C:
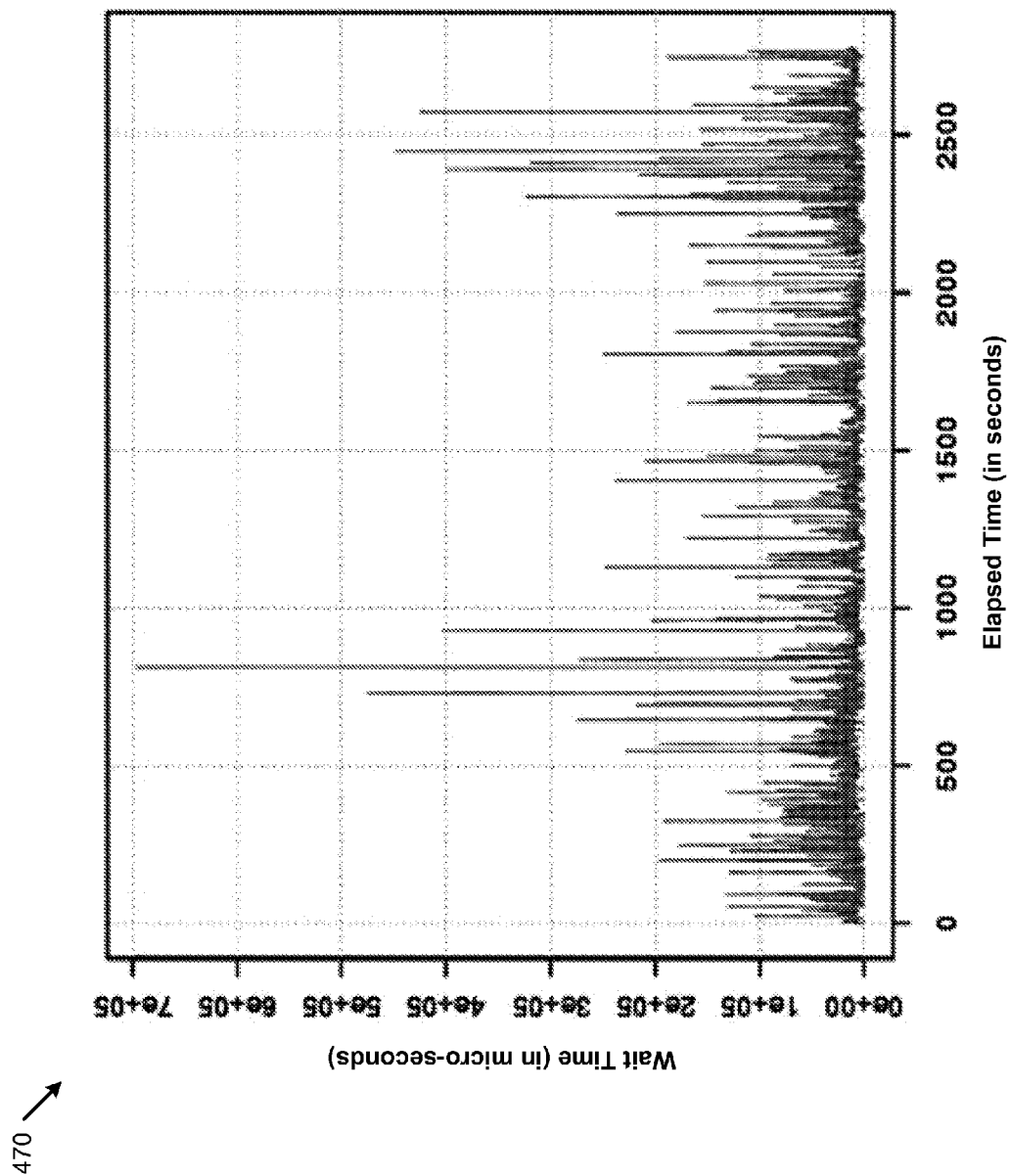
FIG. 4C is a plot showing wait time durations as a function of elapsed time, according to some embodiments.

FIG. 4C is a plot 470 showing wait time durations as a function of elapsed time. Shown is an example of two series of entries of raw data sampled at a certain point in time. The example of FIG. 4C is purely illustrative; in actual practice, the number of entries of raw data could reach into thousands at each point. Referring again to FIG. 4B, the time series $147_1$ depicts the refined data for the set of time series e0 through e19 whereas plot 470 depicts the plotted values for a single time series (specifically plot 470 is the plot of signal e4) over a period of about 3000 seconds. As can be noted by inspection of the plot 470 is how the techniques described in this disclosure result in a transformation of a large amount raw data into a continuous function that is human-interpretable to describe aspects of the monitored system's behaviors.

Figure 5:
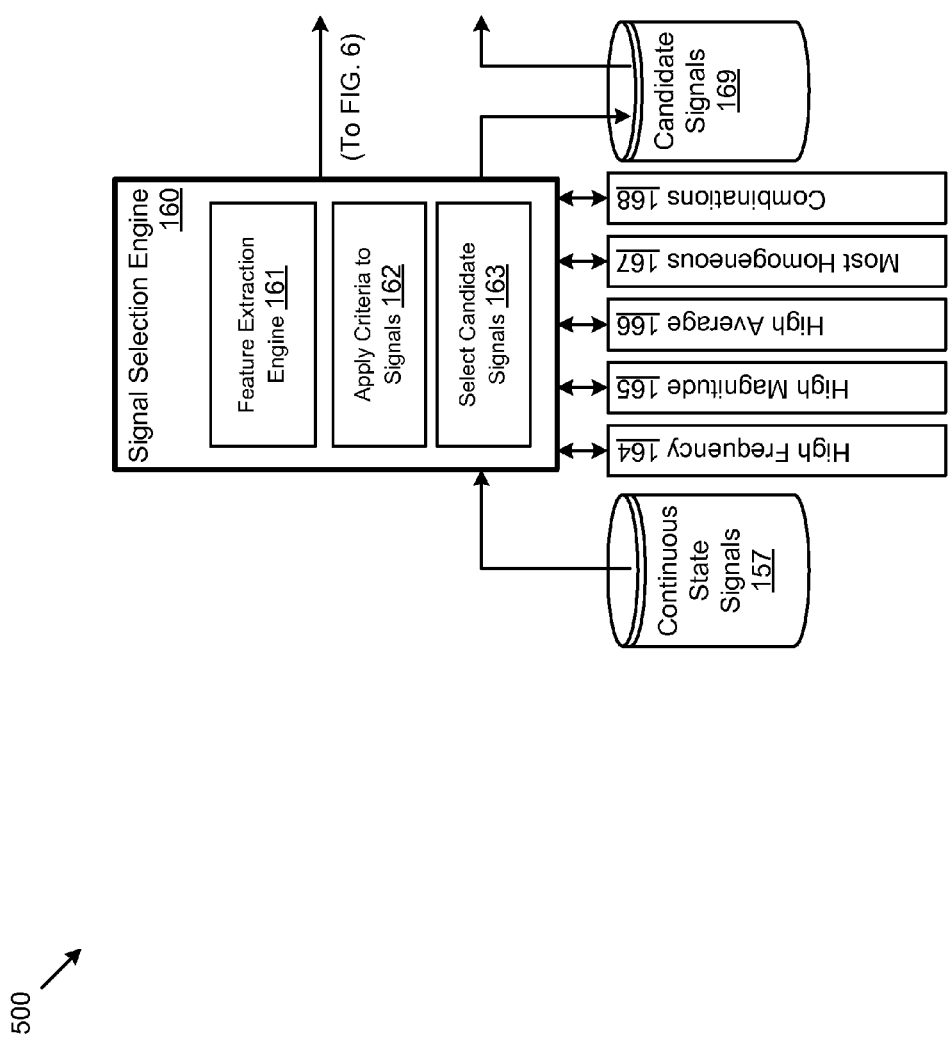
FIG. 5 is a block diagram of a statistical signal analysis and selection system, according to some embodiments.

FIG. 5 is a block diagram of a statistical signal analysis and selection system 500 configured for analyzing database cluster behavior by transforming many discrete event measurements into a time series to isolate dominant signals. As an option, the present statistical signal analysis and selection system 500 may be implemented in the context of the architecture and functionality of the embodiments described herein. Also, the statistical signal analysis and selection system 500 or any aspect therein may be implemented in any desired environment.

The statistical signal analysis and selection system 500 employs techniques and algorithms to analyze its input and then select a subset of few but effective signals (e.g., candidate signals) that will be used to construct robust machine learning models for subsequent detecting and predicting target system behavior.

As shown, the statistical signal analysis and selection system 500 might employ one or more plug-ins. For example the statistical signal analysis and selection system 500 might use a high frequency plug-in 164 to identify high-frequency transitions (e.g., transitions that occur at a frequency higher than a threshold), a high magnitude plug-in 165, a high average plug-in 166, and/or a most homogeneous plug-in 167, or any combinations. For example, a combination plug-in 168 might select signals that have a high (or highest) magnitude, and intersect those signals with signals that have small (or smallest) standard deviations (e.g., using or a most homogeneous plug-in 167).

Figure 6:
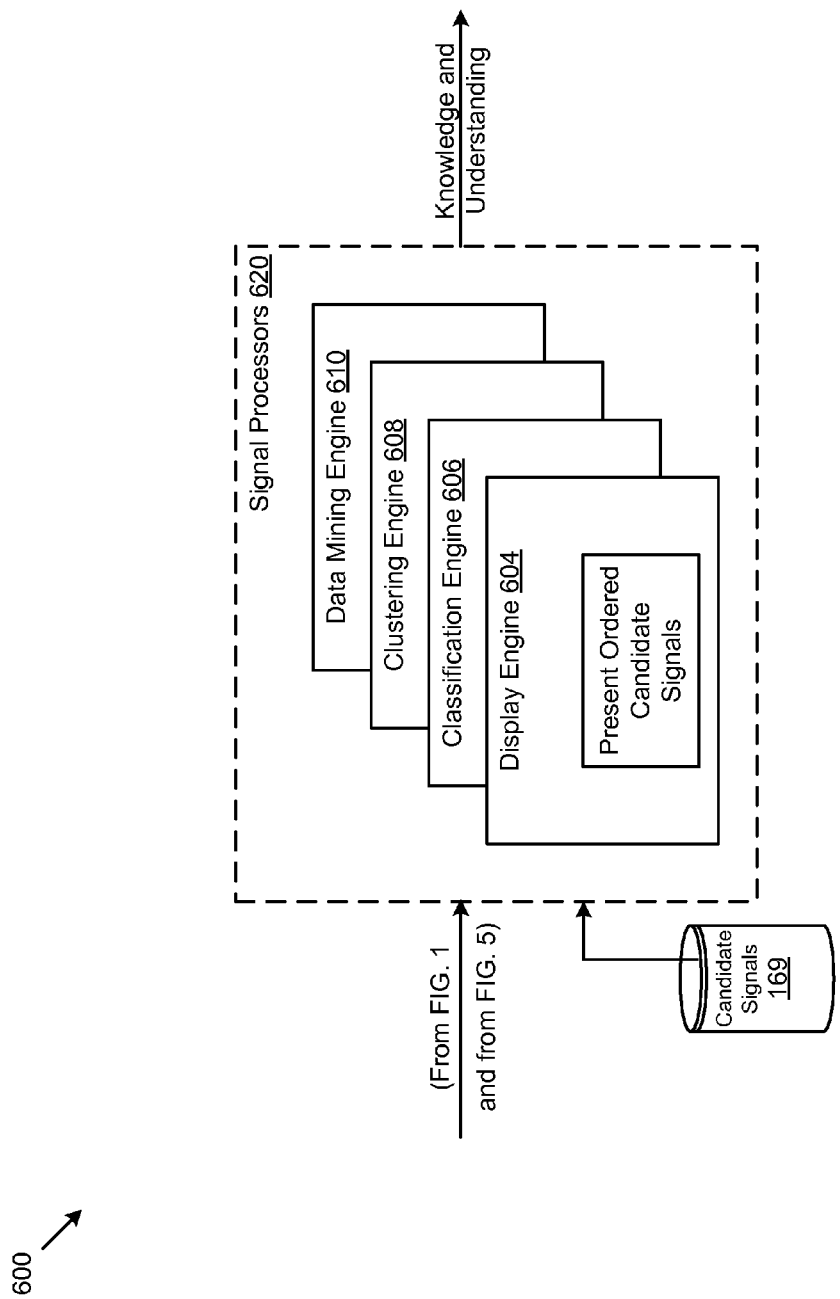
FIG. 6 is a block diagram of a selection of continuous signal processors, according to some embodiments.

FIG. 6 is a block diagram of a selection of continuous signal processors 600 configured for analyzing database cluster behavior by transforming many discrete event measurements into a time series to isolate dominant signals. As an option, the present selection of continuous signal processors 600 may be implemented in the context of the architecture and functionality of the embodiments described herein. Also, the selection of continuous signal processors 600 or any aspect therein may be implemented in any desired environment.

The shown block diagram depicts a selection of continuous signal processors that can operate on its input data (e.g., candidate signals 169).

In one embodiment, human-understandable information can be obtained by simply plotting the candidate signals. Other techniques apply supervised learning classification techniques against the candidate signals which can serve to detect subtle drifts in the target system performance. Additional valuable insights and actionable information can be derived when applying other techniques such as:

data mining; and clustering.

To facilitate sought-after human understanding, the herein-disclosed time series and model produced through the engines described by this disclosure enables human acquisition of valuable insights and actionable information.

ADDITIONAL EMBODIMENTS OF THE DISCLOSURE

Figure 7:
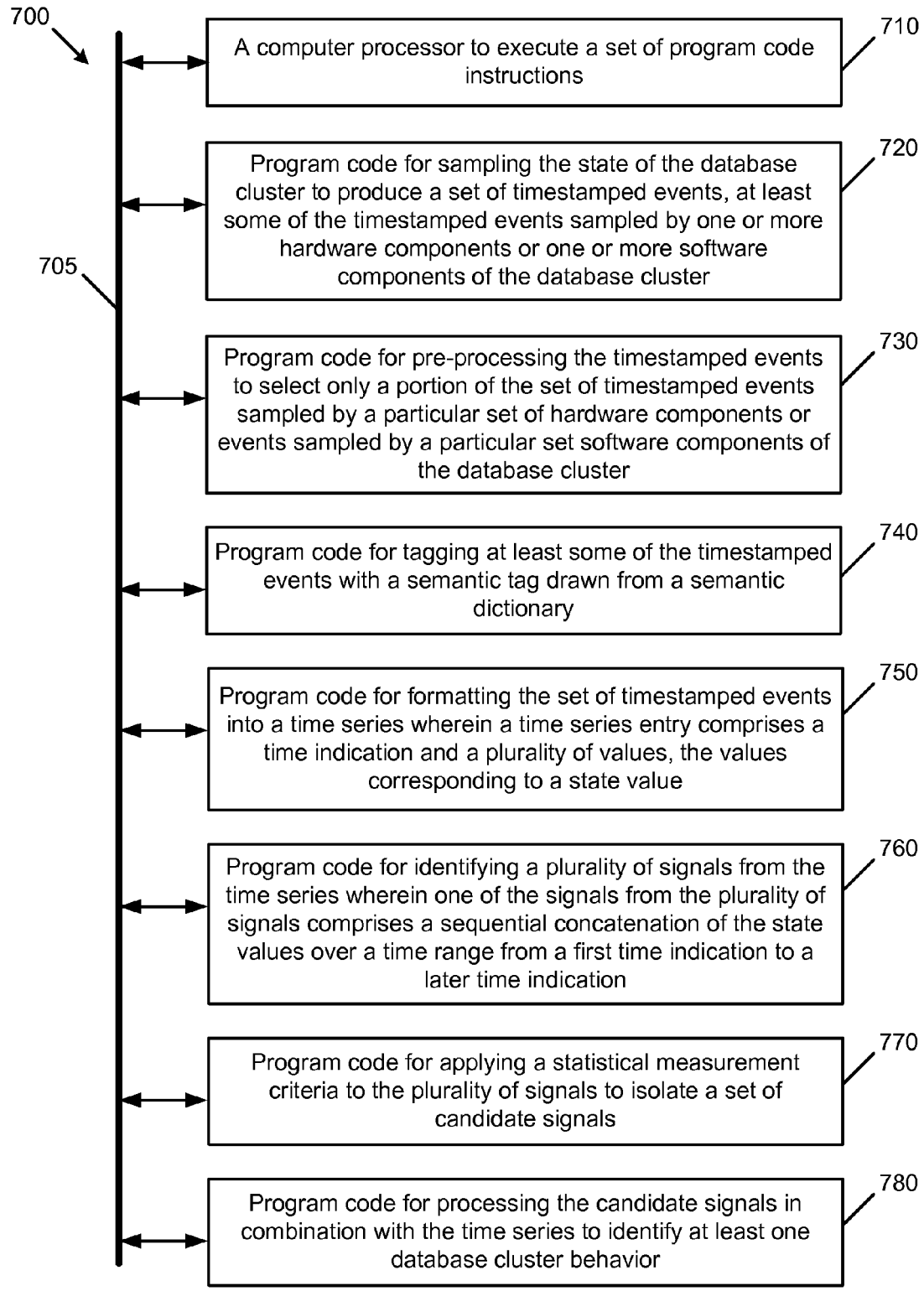
FIG. 7 depicts a series of modules for analyzing database cluster behavior by transforming many discrete event measurements into a time series to isolate dominant signals, according to some embodiments.

FIG. 7 depicts a series of modules for analyzing database cluster behavior by transforming many discrete event measurements into a time series to isolate dominant signals. As an option, the present system 700 may be implemented in the context of the architecture and functionality of the embodiments described herein. Of course, however, the system 700 or any operation therein may be carried out in any desired environment. As shown, system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The embodiment of FIG. 7 implements a portion of a computer system, shown as system 700, comprising a computer processor to execute a set of program code instructions (see module 710) and modules for accessing memory to hold program code instructions to perform: sampling a plurality of discrete event measurements of the database cluster to produce a set of timestamped events, at least some of the timestamped events sampled by one or more hardware components or one or more software components of the database cluster (see module 720); pre-processing the timestamped events to select only a portion of the set of timestamped events sampled by a particular set of hardware components or events sampled by a particular set software components of the database cluster (see module 730); tagging at least some of the timestamped events with a semantic tag drawn from a semantic dictionary (see module 740); formatting the set of timestamped events into a time series wherein a time series entry comprises a time indication and a plurality of values, the values corresponding to a state value (see module 750); identifying a plurality of signals from the time series wherein one of the signals from the plurality of signals comprises a sequential concatenation of the state values over a time range from a first time indication to a later time indication (see module 760); applying a statistical measurement criteria to the plurality of signals to isolate a set of candidate signals (see module 770); and processing the time series to identify at least one database cluster behavior (see module 780).

System Architecture Overview

Figure 8:
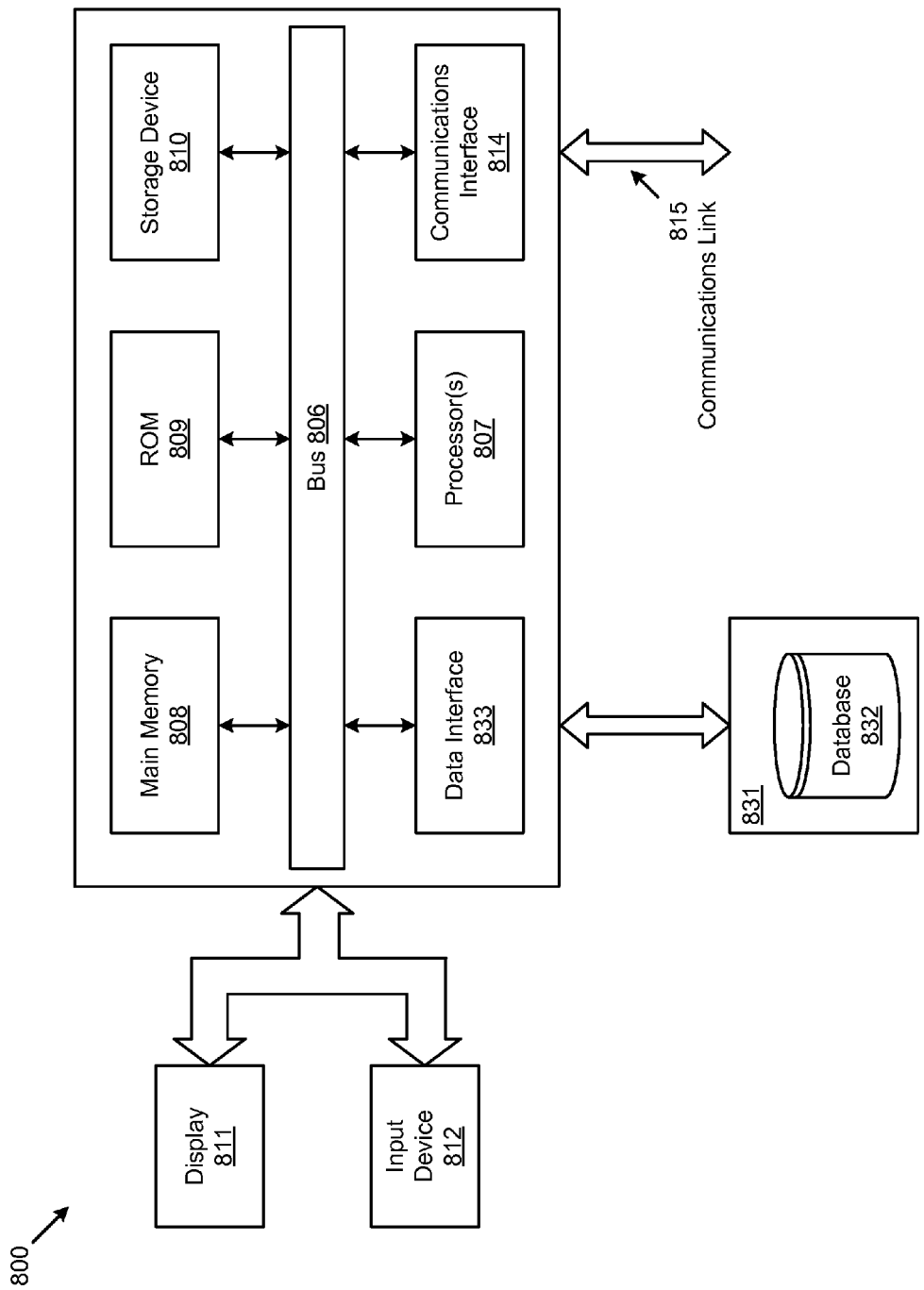
FIG. 8 depicts a block diagram of an instance of a computer system suitable for implementing an embodiment of the present disclosure.

FIG. 8 depicts a block diagram of an instance of a computer system 800 suitable for implementing an embodiment of the present disclosure. Computer system 800 includes a bus 806 or other communication mechanism for communicating information, which interconnects subsystems and devices, such as a processor 807, a system memory 808 (e.g., RAM), a static storage device (e.g., ROM 809), a disk drive 810 (e.g., magnetic or optical), a data interface 833, a communication interface 814 (e.g., modem or Ethernet card), a display 811 (e.g., CRT or LCD), input devices 812 (e.g., keyboard, cursor control), and an external data repository 831.

According to one embodiment of the disclosure, computer system 800 performs specific operations by processor 807 executing one or more sequences of one or more instructions contained in system memory 808. Such instructions may be read into system memory 808 from another computer readable/usable medium, such as a static storage device or a disk drive 810. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 800. According to certain embodiments of the disclosure, two or more computer systems 800 coupled by a communications link 815 (e.g., LAN, PTSN, or wireless network) may perform the sequence of instructions required to practice the disclosure in coordination with one another.

Computer system 800 may transmit and receive messages, data, and instructions, including programs (e.g., application code), through communications link 815 and communication interface 814. Received program code may be executed by processor 807 as it is received, and/or stored in disk drive 810 or other non-volatile storage for later execution. Computer system 800 may communicate through a data interface 833 to a database 832 on an external data repository 831. A module as used herein can be implemented using any mix of any portions of the system memory 808, and any extent of hard-wired circuitry including hard-wired circuitry embodied as a processor 807.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for analyzing performance of components of a database cluster by transforming discrete events into a time series to identify dominant signals, the method comprising:

sampling, using a measurement instrument, a plurality of discrete event measurements of the database cluster to produce a set of timestamped events, the database cluster comprising a plurality of nodes that share a shared resource, and the plurality of discrete event measurements obtained from multiple ones of the plurality of nodes;

tagging at least one of the timestamped events sampled by one or more hardware components or one or more software components of the database cluster with a semantic tag, wherein tagging the at least one of the timestamped events with the semantic tag comprises assigning a state corresponding to the shared resource of the database cluster, the semantic tag includes at least a first state of waiting for the shared resource and a second state of obtaining access to the shared resource;

generating a single magnitude value for a related set of the timestamped events for multiple sessions with respect to the semantic tag for the first state of waiting for the shared resource or the second state of obtaining access to the shared resource by applying different weighting factors to some or all of the sessions of the timestamped events corresponding to the first and second state to derive the single magnitude value;

formatting the set of timestamped events into a time series, wherein a time series entry comprises a time indication and a plurality of values, at least one of the plurality of values corresponding to the single magnitude value generated for the related set of the semantic tag for the multiple sessions in the database cluster; and processing the time series to identify at least one state signal.

2. The method of claim 1, further comprising:

filtering noise and redundant data from the plurality of discrete event measurements;

deriving state transitions from the semantic tag that is applied to the timestamped events, wherein the state transitions are dispersed over one or more time periods;

generating the single magnitude value such that the weighting of semantics is applied to multi-dimensional data; and generating a continuous signal to format the set of timestamped events into the time series comprises using a signal selection engine to identify the at least one state signal, wherein the signal selection engine comprises a statistical engine to apply statistical criteria to select the at least one state signal.

3. The method of claim 1, wherein the time series comprises a series of vectors of state values.

4. The method of claim 1, wherein the one or more hardware components is taken from a resource list and the one or more software components is taken from a process list.

5. The method of claim 1, further comprising smoothing the set of timestamped events to remove events exhibiting highest-frequency fluctuations.

6. The method of claim 1, further comprising extracting a dominant signal from the time series.

7. The method of claim 1, further comprising displaying, using a display screen, the dominant signal.

8. A computer system for analyzing performance of components of a database cluster by transforming discrete events into a time series to identify dominant signals, the computer system comprising:
- a computer processor to execute a set of program code instructions; and
- a memory to hold the program code instructions, in which the program code instructions comprises program code to perform;
- sampling a plurality of discrete event measurements of the database cluster to produce a set of timestamped events, the database cluster comprising a plurality of nodes that share a shared resource, and the plurality of discrete event measurements obtained from multiple ones of the plurality of nodes;
- tagging at least one of the timestamped events sampled by one or more hardware components or one or more software components of the database cluster with a semantic tag, wherein tagging the at least one of the timestamped events with the semantic tag comprises assigning a state corresponding to the shared resource of the database cluster, the semantic tag includes at least a first state of waiting for the shared resource and a second state of obtaining access to the shared resource;
- generating a single magnitude value for a related set of the timestamped events for multiple sessions with respect to the semantic tag for the first state of waiting for the shared resource or the second state of obtaining access to the shared resource by applying different weighting factors to some or all of the sessions of the timestamped events corresponding to the first and second state to derive the single magnitude value;
- formatting the set of timestamped events into a time series, wherein a time series entry comprises a time indication and a plurality of values, at least one of the plurality of values corresponding to the single magnitude value generated for the related set of the semantic tag for the multiple sessions in the database cluster; and
- processing the time series to identify at least one state signal.

9. The computer system of claim 8, wherein the program code instructions further comprises program code to perform:
- filtering noise and redundant data from the plurality of discrete event measurements;
- deriving state transitions from the semantic tag that is applied to the timestamped events, wherein the state transitions are dispersed over one or more time periods;
- generating the single magnitude value such that the weighting of the semantics is applied to multi-dimensional data; and
- generating a continuous signal to format the set of timestamped events into the time series comprises using a signal selection engine to identify the at least one state signal, wherein the signal selection engine comprises a statistical engine to apply statistical criteria to select the at least one state signal.

10. The computer system of claim 8, wherein the time series comprises a series of vectors of state values.

11. The computer system of claim 8, wherein the one or more hardware components is taken from a resource list and the one or more software components is taken from a process list.

12. The computer system of claim 8, further comprising program code for smoothing the set of timestamped events to remove events exhibiting highest-frequency fluctuations.

13. The computer system of claim 8, further comprising program code for extracting a dominant signal from the time series.

14. The computer system of claim 8, further comprising program code for displaying, using a display screen, the dominant signal.

15. A computer program product embodied in a non-transitory computer readable medium, the computer readable medium having stored thereon a sequence of instructions which, when executed by a processor causes the processor to execute a process to analyze performance of components of a database cluster by transforming discrete events into a time series to identify dominant signals, the process comprising:
- sampling a plurality of discrete event measurements of the database cluster to produce a set of timestamped events the database cluster comprising a plurality of nodes that share a shared resource, and the plurality of discrete event measurements obtained from multiple ones of the plurality of nodes;
- tagging at least one of the timestamped events sampled by one or more hardware components or one or more software components of the database cluster with a semantic tag, wherein tagging the at least one of the timestamped events with the semantic tag comprises assigning a state corresponding to the shared resource of the database cluster, the semantic tag includes at least a first state of waiting for the shared resource and a second state of obtaining access to the shared resource;
- generating a single magnitude value for a related set of the timestamped events for multiple sessions with respect to the semantic tag for the first state of waiting for the shared resource or the second state of obtaining access to the shared resource by applying a different weighting factors to some or all of the sessions of the timestamped events corresponding to the first and second state to derive the single magnitude value;
- formatting the set of timestamped events into a time series, wherein a time series entry comprises a time indication and a plurality of values, at least one of the plurality of values corresponding to the single magnitude value generated for the related set of the semantic tag for the multiple sessions in the database cluster; and
- processing the time series to identify at least one state signal.

16. The computer program product of claim 15, the process further comprising:
- filtering noise and redundant data from the plurality of discrete event measurements;
- deriving state transitions from the semantic tag that is applied to the timestamped events, wherein the state transitions are dispersed over one or more time periods;
- generating the single magnitude value such that the weighting of the semantics is applied to multi-dimensional data; and generating a continuous signal to format the set of timestamped events into the time series comprises using a signal selection engine to identify the at least one state signal, wherein the signal selection engine comprises a statistical engine to apply statistical criteria to select the at least one state signal.

17. The computer program product of claim 15, wherein the time series comprises a series of vectors of state values.

18. The computer program product of claim 15, wherein the one or more hardware components is taken from a resource list and the one or more software components is taken from a process list.

19. The computer program product of claim 15, the process further comprising instructions for smoothing the set of timestamped events to remove events exhibiting highest frequency fluctuations.

20. The computer program product of claim 15, the process further comprising instructions for extracting a dominant signal from the time series.

\* \* \* \* \*